United States Patent [19]

Finch et al.

[11] Patent Number: 5,316,168
[45] Date of Patent: May 31, 1994

[54] DOOR COVER ASSEMBLY

[75] Inventors: Steven J. Finch, Sunrise; Kok H. Chong, Tamarac; Julio Abdala, Miami, all of Fla.

[73] Assignee: Motorola, Inc., Schaumburg, Ill.

[21] Appl. No.: 85,797

[22] Filed: Jul. 6, 1993

[51] Int. Cl.5 ............................................. B65D 43/26
[52] U.S. Cl. ................................... 220/341; 220/334
[58] Field of Search ............... 220/341, 334, 337, 340, 220/342, 61.7

[56] References Cited

U.S. PATENT DOCUMENTS

| | | | |
|---|---|---|---|
| 4,106,663 | 8/1978 | Nakao | 220/334 |
| 4,204,608 | 5/1980 | Gatto . | |
| 4,391,883 | 7/1983 | Williamson et al. . | |
| 4,448,327 | 5/1984 | Cahm | 220/341 |
| 4,470,517 | 9/1984 | Carrier | 220/341 |
| 4,522,311 | 6/1985 | Zkeda | 220/334 |
| 4,593,833 | 6/1986 | Hill | 220/334 |
| 4,840,288 | 6/1989 | Lunderman et al. | 220/334 |
| 5,117,073 | 5/1992 | Mischenko . | |
| 5,185,790 | 2/1993 | Mischenko . | |

Primary Examiner—Joseph Man-Fu Moy
Attorney, Agent, or Firm—Andrew S. Fuller

[57] ABSTRACT

A detachable self-contained door cover assembly (105) includes a housing (101) with an integral socket (160), a hinge member (140) having a rotation track (153), and a door cover (120) having an integral hinge shaft (123). The hinge shaft (123) engages the rotation track (153) to rotatably couple the door cover (120) to the hinge member (140) about an axis of rotation extending through the hinge shaft (123) and the rotation track (153). The hinge member (140) is attached to the socket (160), and is detachable when a force exceeding a threshold value is applied to the hinge member (140), thereby disengaging the hinge member (140) from the socket (160) without substantial damage to the hinge member (140) or to the housing (101).

11 Claims, 2 Drawing Sheets

DOOR COVER ASSEMBLY

TECHNICAL FIELD

This invention relates in general to door cover assemblies, and in particular, to door cover assemblies used on electronic devices.

BACKGROUND

Door cover assemblies used to cover the controls on electronic devices have become popular in recent years. Increasingly seen on video cameras, stereo equipment and personal electronic devices, the door covers serve to protect electronic controls from accidental engagement, and also often serve to provide a smaller and more attractive electronic device package. For similar reasons, this concept has been gaining popularity in the design of hand-held communication devices. Existing applications include cordless telephones and portable cellular radio telephones which use a folding arrangement allowing these devices to be more compact. In some of these devices, the door cover "flips" open to activate the device, and also functions as a mouthpiece for the user. Other functionality can be built into the door cover ("flip door").

In one typical design, the flip door is attached to the main housing of a hand-held communication device using a hinge mechanism attached to the body of the main housing. The flip door is repeatedly opened and closed during normal use, and hence over time, the resultant stress on the hinge can lead to failure of the hinge mechanism. Additionally, a large force exerted on the flip door may cause damage to the hinge mechanism, and possibly to the main housing. For assemblies using the typical design, the device must be at least partially disassembled to repair or replace the damaged door cover assembly. If the device housing is damaged, a more extensive, and usually more expensive, operation will be needed to repair the device. The difficulty and cost of repairs, and the potential damage to the device housing when excess force is applied to the door cover, are all deficiencies which exist with present door cover assembly designs.

Another deficiency with current door cover assembly designs is the number of factory operations or steps required to complete the assembly. Reducing the number of assembly steps and minimizing the number of parts used are important contributions to reducing costs and increasing efficiencies of most manufacturing operations. Assemblies which achieve these objectives are in constant demand in the art.

Therefore, a new door cover assembly is required which is simpler to assemble, easier to repair or replace, and which aids in protecting the device housing to which it is attached.

SUMMARY OF THE INVENTION

Briefly, in accordance with the invention, a detachable self-contained door cover assembly includes a housing with an integral socket, a hinge member having a rotation track therein, and a door cover having an integral hinge shaft. The hinge shaft engages the rotation track to rotatably couple the door cover to the hinge member about an axis of rotation extending through the hinge shaft and the rotation track. The hinge member is attached to the socket, and is detachable when a force exceeding a threshold value is applied to the hinge member, thereby disengaging the hinge member from the socket without substantial damage to the hinge member or to the housing.

DETAILED DESCRIPTION OF THE PREFERRED EMBODIMENT

Figure 1:
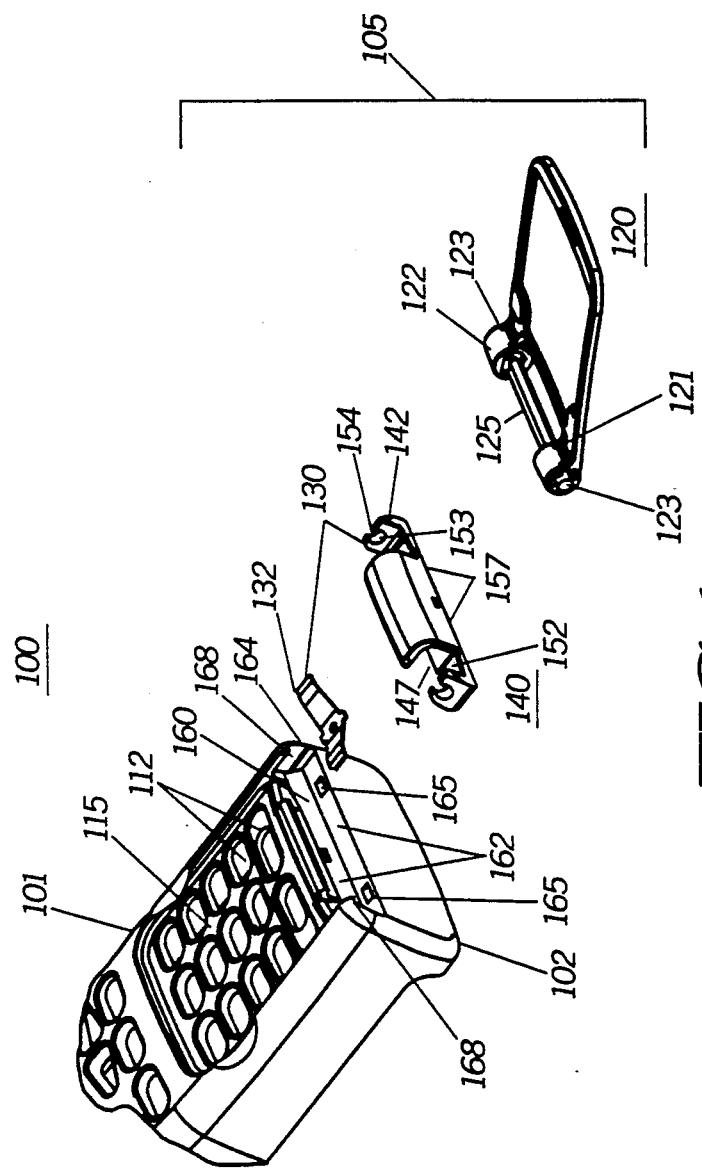
FIG. 1 is a fragmentary exploded perspective view of a portable two-way radio incorporating a door cover assembly, in accordance with the present invention.

Referring to FIG. 1, a portable two-way radio 100 is shown which incorporates a door cover assembly 105, in accordance with the present invention. The portable radio 100 contains electronic circuitry (not shown) which allows communications over a radio frequency channel. The radio 100 comprises a body portion enclosed by a housing 101, and a door cover 120, commonly referred to as a flip door, rotatably mounted to the housing 101. The door cover 120 rotates between an open position and a closed position with respect to the housing 101 of the radio. The open door cover switches the radio 100 on, exposes radio control keys 112 for access by the user, and also serves to channel the user's voice to a radio microphone (not shown). When closed, the door cover 120 protects the radio control keys 112 from inadvertent engagement and switches the radio 100 off.

The door cover assembly 105 includes the door cover 120, a hinge assembly 130, and an integral radio housing socket 160. The hinge assembly 130 is detachable from the socket 160, when a force exceeding a threshold value is applied to the hinge assembly 130, thereby allowing the hinge assembly 130 to disengage from the socket 160 without substantial damage to the hinge assembly 130 or to the housing 101. Such force may be present, for instance, when the door cover 120 is rotated beyond the normal open position, and may also be present if the radio 100 should fall on the door cover 120.

Figure 2:
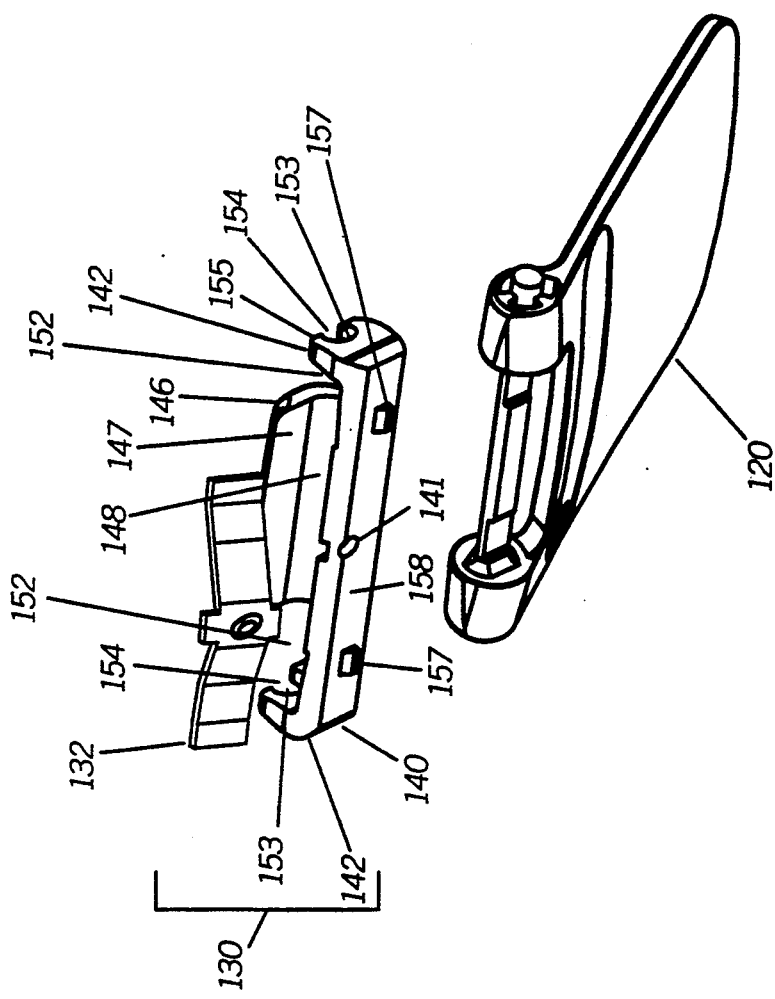
FIG. 2 is an exploded perspective view of a door cover and hinge assembly in accordance with the present invention.

Referring to FIG. 2, another view of the door cover 120 and hinge assembly 130 is illustrated. The hinge assembly 130 comprises a hinge member 140 and a leaf spring 132. The hinge member 140 is elongated, and has two opposing end walls 142. An integral C-shaped hinge cover 146 with an open face 157 is disposed centrally between both end walls 142. This arrangement creates a cavity 148 extending longitudinally along the hinge member 140, with the cavity 148 accessible through the open face 157 of the hinge cover 146. The leaf spring 132 mounts inside the cavity 148 and is positioned by a slot 141 within the hinge cover 146. Between the hinge cover 146 and each end wall 142 are two channels 152 which accommodate the form of the door cover 120. Each end wall 142 has a bore 153 extending longitudinally therein, and each bore 153 has an access slot extending vertically from the bore 153 to the upper exterior surface 155 of each end wall 142. Together, the bores 153 form a rotation track 153 within which the door cover 120 rotates. Additionally, small protrusions 157 extend from the lower surface of the hinge member 140 and aid in securing the hinge member 140 to the housing socket 160 (see FIG. 1).

Referring back to FIG. 1, the door cover 120 has a base 121 with two hubs 122 on opposing ends of the base 121. Each hub 122 has a cylindrical projection 123, and both projections 123 form a hinge shaft 123 for the door cover 120. The hinge shaft 123 is designed to fit within the rotation track 153 of the hinge member 140. The hinge shaft 123 rotates about an axis of rotation extending longitudinally through the center of the hinge shaft 123 and the center of the rotation track 153.

An integral cam shaft 125 having a triangular shape extends between both hubs 122 of the door cover 120. The cam shaft 125 interacts with the leaf spring 132 within the hinge assembly 130 to control the rotational resistance of the door cover 120 within the hinge assembly 130.

The socket 160, in which the hinge assembly 130 is mounted, is integrated within the radio housing 101, and is adjacent to the set of control keys 112 which the door cover 120 protects. The socket 160 is an L-shaped cavity located along the base 102 of the radio housing 101 and adjoining the planar front surface 115 of the radio housing 101. Thus, the walls 162, 164 of the socket 160 are formed from the housing 101 and constitute retaining side walls 162, 164 for the hinge assembly 130. Two opposing side walls 164 along the base delimit the socket 160 area. Additionally, integral guide rails 168 are formed on these opposing side walls 164 to aid in guiding the hinge assembly 130 into the socket 160 during assembly. Recessed areas 165 are located on the surface of the socket 160 and are designed to accommodate the protrusions 157 (see FIG. 2) on the hinge member 140.

The assembly process highlights some of the benefits of the present invention. The door cover 120 mounts within the hinge assembly 130 by snapping the hinge shaft 123 through the access slots 154 into the bores 153 within the end walls 142 of the hinge member 140. The leaf spring 132 mounts within the hinge member 140 to form a self-contained door cover 120 and hinge assembly 130. In this configuration, the cam shaft 125 cooperates with the leaf spring 132 to urge the door cover 120 towards a first rotational position when the rotational angle of the door cover 120 is less than a threshold angle of approximately 50 degrees, and towards a second rotational position when the rotational angle of the door cover 120 is greater than the threshold angle. These angles are measured with respect to the planar front surface of the radio housing 101. The first rotational position is parallel to the front planar surface 115 of the radio housing 101, and corresponds to the closed position of the door cover 120. The second rotational position is a predetermined angle of approximately 150 degrees, with respect to the planar front surface 115, and corresponds to the open position of the door cover 120.

The door cover 120 and hinge assembly 130 mounts to the radio housing 101 by inserting the hinge assembly 130 along the guide rails 168 into the socket 160. The guide rails 168 and the retaining side walls 162,164 together substantially limit the movement of the hinge assembly 130 within the socket 160 in all but the direction of insertion. The recessed areas 165 within the socket 160 combine with the protrusions 157 (see FIG. 2) on the surface of the hinge member 140 to form a snap attachment arrangement which substantially impedes the detachment of the hinge assembly 130 from the socket 160 after the hinge assembly 130 is mounted. This snap arrangement is detachable in the direction opposite the direction of insertion, when a force exceeding the threshold value is applied to the hinge member 140. The hinge assembly 130 detaches as the protrusions 157 (see FIG. 2) become unseated under the load of this force. The geometric shape and size of the protrusions 157 is such that the protrusions 157, rather than the ratio housing 101, sustain any consequential deformation caused by the detachment of the hinge assembly 130 from the socket 160. However, the deformation of the protrusions 157 is sufficiently small such that the hinge assembly 130 can be easily reinserted into the socket 160 without substantial loss of functionality.

The door cover assembly 105 addresses many of the problems found in the prior art. As a self-contained assembly, the door cover 120 and hinge assembly 130 can be tested as a unit before being assembled to the radio housing 101. The door cover 120 and hinge assembly 130 are externally mounted to the radio housing 101 thus avoiding potential damage to the radio internals through inadvertence. This facilitates both factory assembly and repair should the door cover 120 or hinge assembly 130 sustain damage. A large force exerted on the door cover 120 causes the door cover 120 and hinge assembly 130 to detach from the radio housing 101 thus protecting the radio 100 from unnecessary damage. Therefore, a door cover assembly 105 made in accordance with the present invention is simpler to assemble, easier to repair or replace, and helps to protect the radio 100 from damage.

What is claimed is:

1. A detachable self-contained door cover assembly, comprising:
    a hinge member having a rotation track therein;
    a door cover having an integral hinge shaft, said hinge shaft engaging the rotation track to rotatably couple said door cover to said hinge member about an axis of rotation extending through said hinge shaft and said rotation track;
    a housing having an integral socket; and
    attachment means, engaging said hinge member and said housing, for attaching said hinge member within said socket, said attachment means being detachable, when a force exceeding a threshold value is applied to said hinge member, thereby disengaging said hinge member from said socket without substantial damage to said hinge member or to said housing.

2. A detachable self-contained door cover assembly as defined in claim 1, wherein:
    said housing includes a recessed area located within said socket; and
    said attachment means include a protrusion extending from said hinge member and forcibly positioned within said recessed area, said protrusion forming a snap insertion arrangement with said recessed area to substantially impede the detachment of said hinge member from said socket after snap insertion.

3. A detachable self-contained door cover assembly as defined in claim 1, further comprising:
    means, cooperating with said door cover and said hinge member, for controlling rotational resistance of said door cover within said hinge member.

4. A detachable self-contained door cover assembly as defined in claim 3, wherein said main housing has a front planar surface, and said door cover rotates about a rotational angle between at least two rotational positions relative to said front planar surface, a first rotational position substantially parallel to said front planar surface, and a second rotational position at a predetermined angle to said front planar surface, said rotational resistance controlling means comprising:

a resilient member mounted within said hinge member; and an integral cam shaft located on said door cover pivotably engaging said resilient member, said cam shaft cooperating with said resilient member to urge said door cover towards the first rotational position when the rotational angle is less than a threshold angle, and towards the second rotational position when the rotational angle is greater than said threshold angle.

5. A detachable self-contained door cover assembly as defined in claim 4, wherein said resilient member is a leaf spring.

6. A detachable self-contained door cover assembly as defined in claim 1, wherein:

said socket has retaining side walls, and guide means for guiding said hinge member into said socket during assembly;

said guide means and said retaining side walls together substantially limit the movement of said hinge member within said socket to that of a single detachment direction; and said attachment means substantially limits the movement of said hinge member within said socket in said detachment direction.

7. A detachable self-contained door cover assembly as defined in claim 1, wherein:

said hinge member has two opposing end portions, each of said end portions has a bore extending longitudinally along said axis of rotation, and an access slot leading to said bore, said bores within said end portions constituting said rotation track.

8. A detachable self-contained door cover assembly, comprising:

a hinge member having two opposing end portions, each of said end portions having a bore extending longitudinally therein, and an access slot leading to said bore, said bores within said end portions forming a rotation track within said hinge member;

a door cover having an integral hinge shaft, said hinge shaft engaging the rotation track to rotatably couple said door cover to said hinge member about an axis of rotation extending through said hinge shaft and said rotation track;

a resilient member mounted within said hinge member;

an integral cam shaft located on said door cover pivotably engaging said resilient member, said cam shaft cooperating with said resilient member to urge said door cover towards a first rotational position when said door cover is rotated to an angle less than a threshold value with respect to said first rotational position, and towards a second rotational position when said angle is greater than the threshold value;

a housing having an integral socket, said socket having retaining side walls, and guide means for guiding said hinge member into said socket during assembly, said guide means and said retaining side walls together substantially limiting the movement of said hinge member within said socket to that of a single detachment direction; and attachment means, engaging said hinge member and said housing, for attaching said hinge member within said socket, said attachment means substantially limits the movement of said hinge member within said socket in said detachment direction, said attachment means being detachable, when a force exceeding a threshold value is applied to said hinge member, thereby disengaging said hinge member from said socket without substantial damage to said hinge member or to said housing.

9. A detachable self-contained door cover assembly as defined in claim 8, wherein:

said housing includes a recessed area located within said socket; and said attachment means includes a protrusion extending from said hinge member and forcibly positioned within said recessed area, said protrusion forming a snap insertion arrangement with said recessed area to substantially impede the detachment of said hinge member from said socket after snap insertion.

10. A detachable self-contained door cover assembly as defined in claim 8, wherein said resilient member is a leaf spring.

11. A radio having means for communicating over a radio frequency channel, and having an externally mounted door cover comprising:

a hinge member having a rotation track therein;

a door cover having an integral hinge shaft, said hinge shaft engaging the rotation track to rotatably couple said door cover to said hinge member about an axis of rotation extending through said hinge shaft and said rotation track;

a radio housing;

an integral socket located on said housing; and attachment means, engaging said hinge member and said housing, for attaching said hinge member within said socket, said attachment means being detachable, when a force exceeding a threshold value is applied to said hinge member, thereby disengaging said hinge member from said socket without substantial damage to said hinge member or to said housing.

* * * * *